United States Patent
Volkmann et al.

(10) Patent No.: US 10,794,498 B2
(45) Date of Patent: Oct. 6, 2020

(54) LINE BLOCKER

(71) Applicant: Key Safety Systems, Inc., Sterling Heights, MI (US)

(72) Inventors: Matthias Volkmann, Kronberg (DE); Martin Pieruch, Hochheim (DE); Heiko Struss, Holzhausen a.d.Haide (DE)

(73) Assignee: Key Safety Systems, Inc., Sterling Heights, MI (US)

( * ) Notice: Subject to any disclaimer, the term of this patent is extended or adjusted under 35 U.S.C. 154(b) by 18 days.

(21) Appl. No.: 16/207,345

(22) Filed: Dec. 3, 2018

(65) Prior Publication Data

US 2019/0195371 A1    Jun. 27, 2019

Related U.S. Application Data

(60) Provisional application No. 62/609,735, filed on Dec. 22, 2017.

(51) Int. Cl.
| | |
|---|---|
| *F16K 17/36* | (2006.01) |
| *F16K 7/07* | (2006.01) |
| *F16L 55/105* | (2006.01) |
| *F16L 55/07* | (2006.01) |
| *F16L 55/10* | (2006.01) |
| *F16K 31/163* | (2006.01) |

(52) U.S. Cl.
CPC ............... *F16K 7/075* (2013.01); *F16K 7/07* (2013.01); *F16K 17/36* (2013.01); *F16K 31/163* (2013.01); *F16L 55/07* (2013.01); *F16L 55/105* (2013.01); *F16L 55/1022* (2013.01)

(58) Field of Classification Search
CPC . F16K 7/075; F16K 7/07; F16K 17/36; F16K 31/163; F16L 55/07; F16L 55/1022; F16L 55/105
USPC .............. 137/68.13; 251/4, 7, 343, 344
See application file for complete search history.

(56) References Cited

U.S. PATENT DOCUMENTS

| | | | | |
|---|---|---|---|---|
| 2,841,357 A | * | 7/1958 | Little | F16K 7/06 251/6 |
| 3,013,571 A | * | 12/1961 | Fulton | F16K 13/06 137/68.13 |
| 3,125,108 A | * | 3/1964 | Murphy | B23D 15/145 137/68.14 |
| 3,332,432 A | * | 7/1967 | Marsh | E21B 29/08 137/68.13 |
| 3,517,907 A | * | 6/1970 | Bach | F16K 7/06 251/5 |
| 3,548,848 A | * | 12/1970 | Stichling | F16K 13/06 137/68.13 |
| 3,780,753 A | * | 12/1973 | Jablansky | F16K 17/36 137/68.13 |
| 4,092,010 A | * | 5/1978 | Carlson, Jr. | F16K 7/06 138/45 |
| 4,133,281 A | * | 1/1979 | Holmes | B65B 1/28 141/1 |

(Continued)

*Primary Examiner* — Minh Q Le

(74) *Attorney, Agent, or Firm* — Meunier Carlin & Curfman LLC

(57) ABSTRACT

An igniter 40 activated blocking device 10 blocks a fluid line 4 adapted to carry fluid. The blocking device 10 has a housing 30 disposed about the fluid line, a piston 20 housed in the housing, and an igniter 40 that when activated propels the piston 20 to block the fluid line 4. The igniter 40 generates a shock wave to move the piston 20 to block the line. The piston 20 crushes or squeezes a portion of the line 4 to close the line.

20 Claims, 5 Drawing Sheets

(56) References Cited

U.S. PATENT DOCUMENTS

| | | | | |
|---|---|---|---|---|
| 4,140,041 A * | 2/1979 | Frelau | ............ | B21D 26/08 137/68.13 |
| 4,421,005 A * | 12/1983 | Byrne | ............ | F16K 13/06 137/68.11 |
| 4,516,593 A * | 5/1985 | Muto | ............ | F16K 43/00 137/15.14 |
| 4,516,598 A * | 5/1985 | Stupak | ............ | E21B 29/08 137/318 |
| 4,548,382 A * | 10/1985 | Otting | ............ | F16K 7/06 137/625.65 |
| 4,634,092 A * | 1/1987 | Daniell | ............ | A61M 39/28 251/7 |
| 4,877,053 A * | 10/1989 | Yusko, Jr. | ............ | F16K 7/061 137/556 |
| 4,895,341 A * | 1/1990 | Brown | ............ | F16K 7/061 251/63.4 |
| 4,960,259 A * | 10/1990 | Sunnanvader | ............ | A61M 39/28 251/7 |
| 5,207,409 A * | 5/1993 | Riikonen | ............ | F16K 7/06 137/551 |
| 5,820,162 A * | 10/1998 | Fink | ............ | B60R 21/205 280/742 |
| 6,202,667 B1 * | 3/2001 | Chen | ............ | A62C 4/02 137/457 |
| 7,255,322 B1 * | 8/2007 | Tiwet | ............ | F16K 7/06 251/4 |
| 2008/0098798 A1 * | 5/2008 | Riley | ............ | A61M 5/365 73/19.03 |
| 2008/0237509 A1 * | 10/2008 | Yamamoto | ............ | F16K 7/06 251/7 |
| 2012/0018654 A1 * | 1/2012 | Wennberg | ............ | F16K 7/06 251/9 |
| 2012/0049094 A1 * | 3/2012 | Molavi | ............ | F16L 55/10 251/4 |

* cited by examiner

LINE BLOCKER

FIELD OF THE INVENTION

The present invention relates to a device configured to block a fluid line of a vehicle in the event of an accident to prevent fluid leakage.

BACKGROUND OF THE INVENTION

In the event of a vehicle crash, various fluids can leak from the vehicle such as coolants, oil, transmission fluid, brake fluid, battery acid and petrol or gasoline fluid. The most volatile in terms of combustion is the fuel, particularly gasoline. Fuel tanks are therefore designed to high standards to survive a crash. The fuel lines, however, extend along the length of the vehicle and when cut allow highly combustible fuel to spill out.

The present invention provides a device that can accomplish blocking of the fluid line without any need to be incorporated into the fluid line. The blocking device is configured to be external of the line as described hereinafter.

SUMMARY OF THE INVENTION

An igniter activated blocking device blocks a fluid line adapted to carry fluid. The blocking device has a housing disposed about the fluid line, a piston housed in the housing, and an igniter that when activated propels the piston to block the fluid line. The igniter generates a shock wave to move the piston to block the line. The piston crushes or squeezes a portion of the line to close the line.

The preferred device further has a deformable element initially positioned adjacent line and movable into closing engagement with a wall of the line to create a closing in the line through which the fluid cannot escape. The igniter when activated propels the piston against the deformable element into the line collapsing the wall.

The housing of the blocking device has a first or top body portion having a slotted opening or passageway to receive the fluid line. The housing has the igniter attached to or stored in the first or top body portion. The housing has a second internal body portion with a concavity for receiving the fluid line. The housing has a bottom base portion having one or more venting passages to expel igniter gas from the housing. The first body, second body and bottom portions are separate pieces removably attached to the other allowing attachment of the first body portion slotted opening over the fluid line prior to attaching the second internal body portion to the first body portion to position the housing on the line. The bottom portion, when assembled, clamps to top and internal portions tightly about the line thereby securing the attachment.

The igniter is preferably a pyrotechnic device electrically connected to a crash detection system which activates the igniter on a signal wherein the crash detection system is part of an airbag deployment system and the same signal initiating the airbag deployment activates the igniter. The igniter preferably has a cylindrical propellant charged squib. The piston is positioned on or adjacent to the igniter and spaced from the line. The deformable element has a first concave surface positioned near or on the line. The deformable element is shaped as a semi-circle or a semi-oval. The deformable element is configured to collapse an adjacent portion of the fluid line and then hold tightly blocking the fluid. When collapsed, the shape changes to a convex shape pushing against the line, the ends of the deformable element are held so the deformable element applies a strong force to keep the line closed.

A system can be provided that includes the blocking device in combination with a length of tube or line already fitted to the blocking device. The housing of the blocking device can be a one-piece housing with the tube inserted through a passage in the housing.

BRIEF DESCRIPTION OF THE DRAWINGS

The invention will be described by way of example and with reference to the accompanying drawings in which.

DETAILED DESCRIPTION OF THE INVENTION

Figure 1:
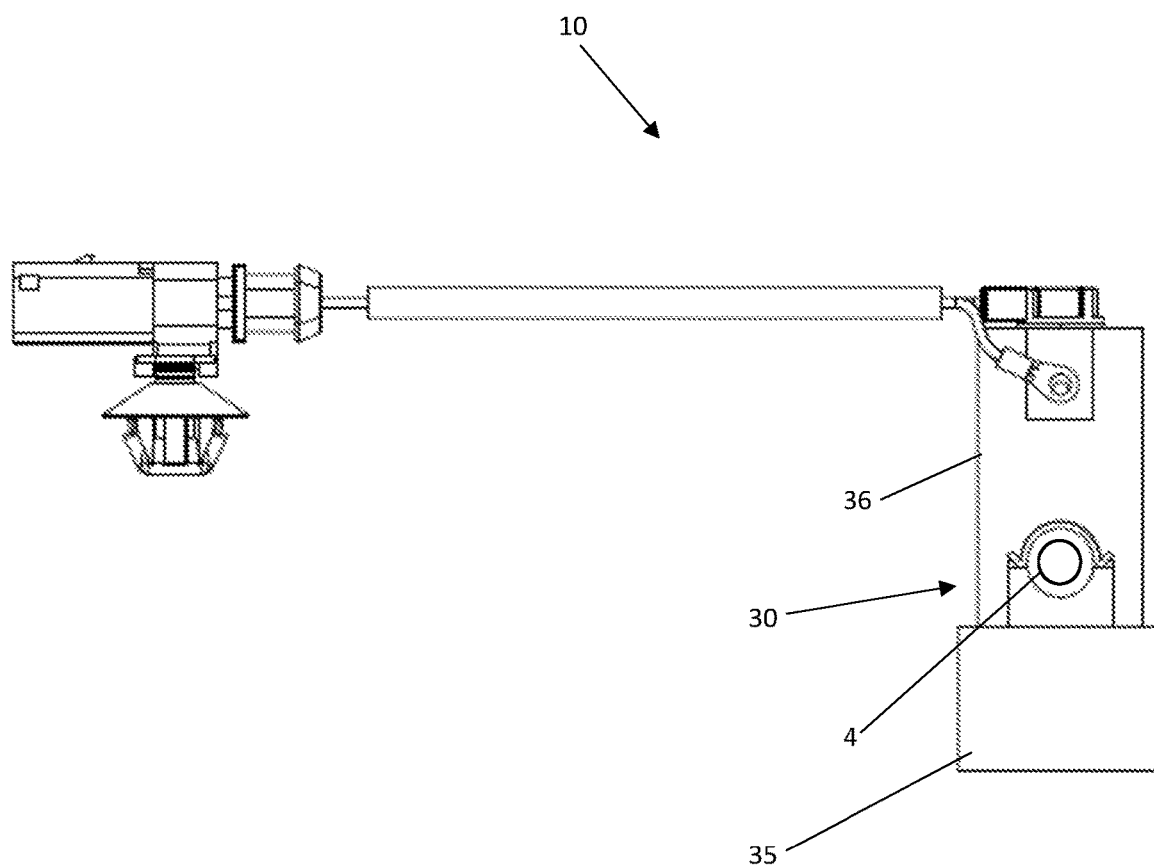
FIG. 1 is a side view of the blocking device of the present invention shown positioned on a section of a fluid line.
Figure 2:
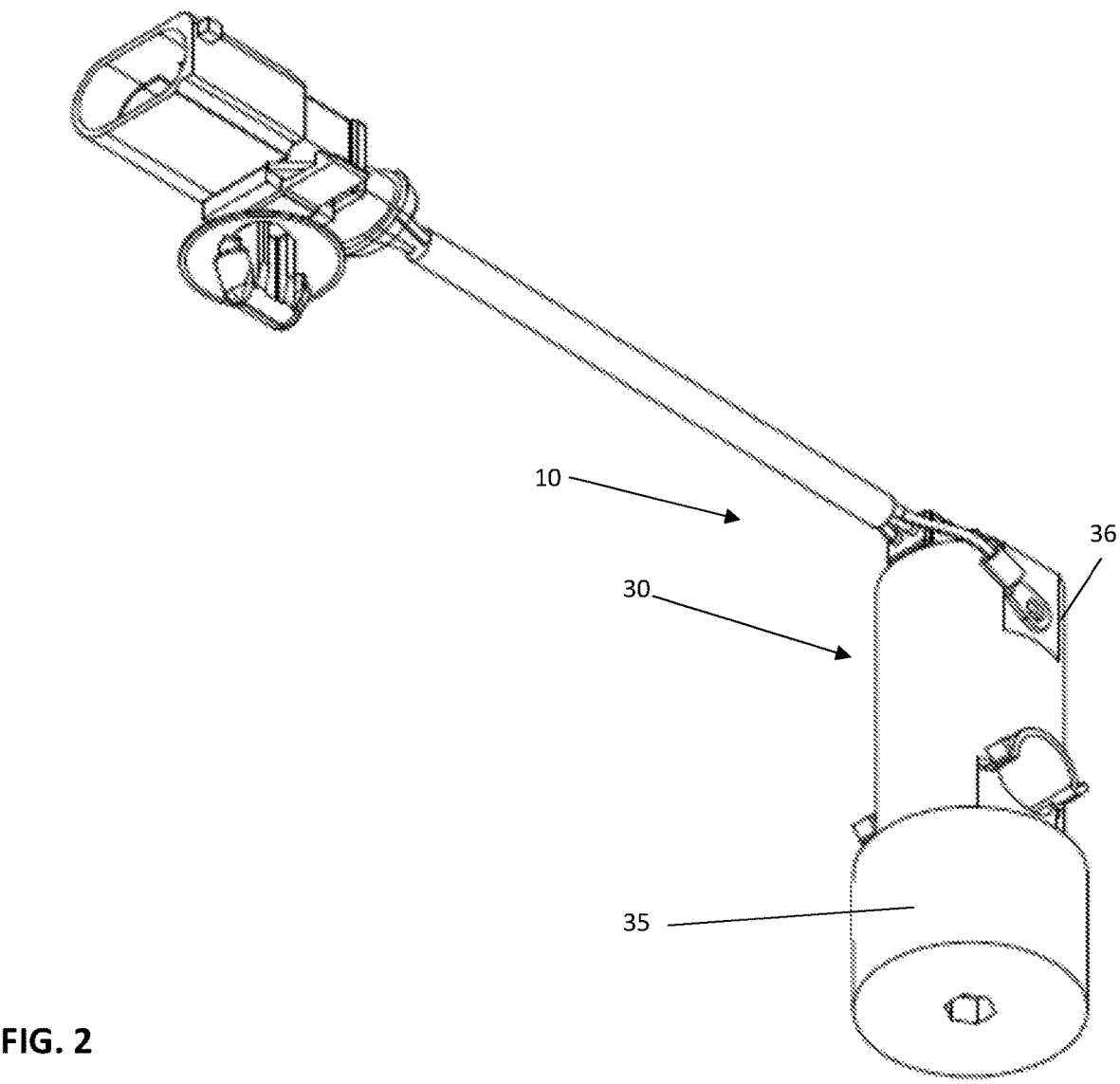
FIG. 2 is a perspective view of the blocking device shown in FIG. 1 with the section of line.

The device 10 is shown on a section of an exemplary fluid line 4 by way of example, the line 4 can be a fluid line for carrying a combustible fluid like gasoline or diesel fuel. In a preferred embodiment, the device 10 clamps on the outside of the line 4, it is not intrusive. With a fluid line system there are always concerns of weak parts of the system. This device 10 does not add a potential leak path to the system. It clamps over the line 4 and it has an electrical connection on the outside and one or more vent holes 12 in the bottom portion or cap 35 of the housing 30. As shown in FIG. 1, the electrical connection has a wiring harness in a tube extending to a connector that can be wired to a vehicle crash detection system. Upon receipt of an accident signal, similar to that which would fire an airbag would also activate this device 10, and immediately block the fluid line to the engine compartment external of the passenger compartment, preferably near the fuel tank. The intention is to make sure there is no opportunity for fuel to spill onto a hot engine or muffler and ignite or for the gas vapors to vent where the occupants are because the vapors could achieve a high enough concentration in the air in the passenger compartment to reach a toxic or explosive level. The present invention is also a safety device to control the line spillage and to make sure that there is no potential for the occupants to be exposed to a fuel fed fire.

Figure 4:
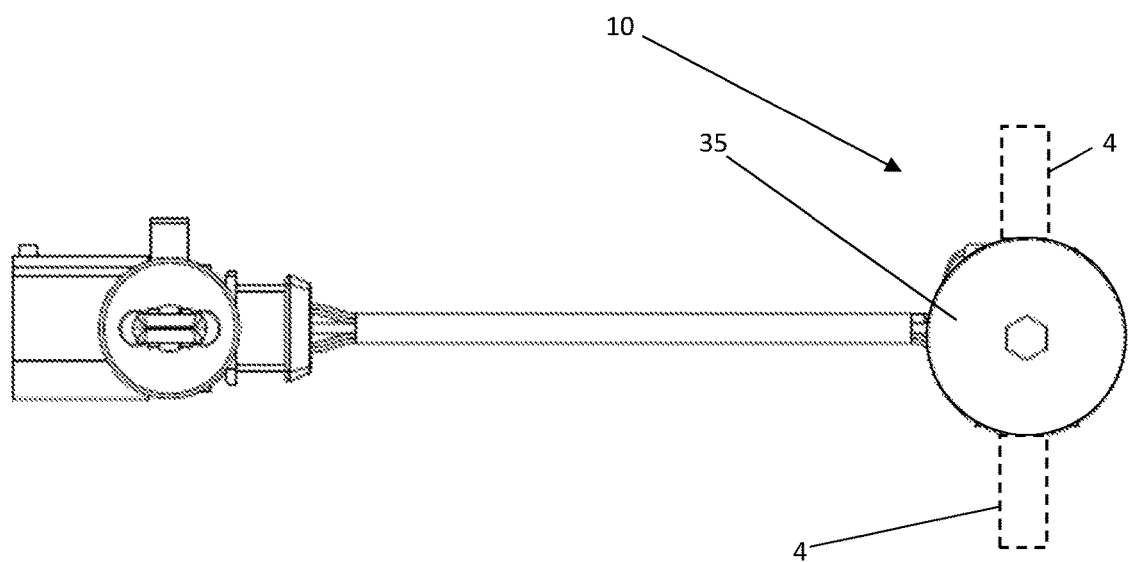
FIG. 4 is a bottom view of the blocking device.
Figure 5:
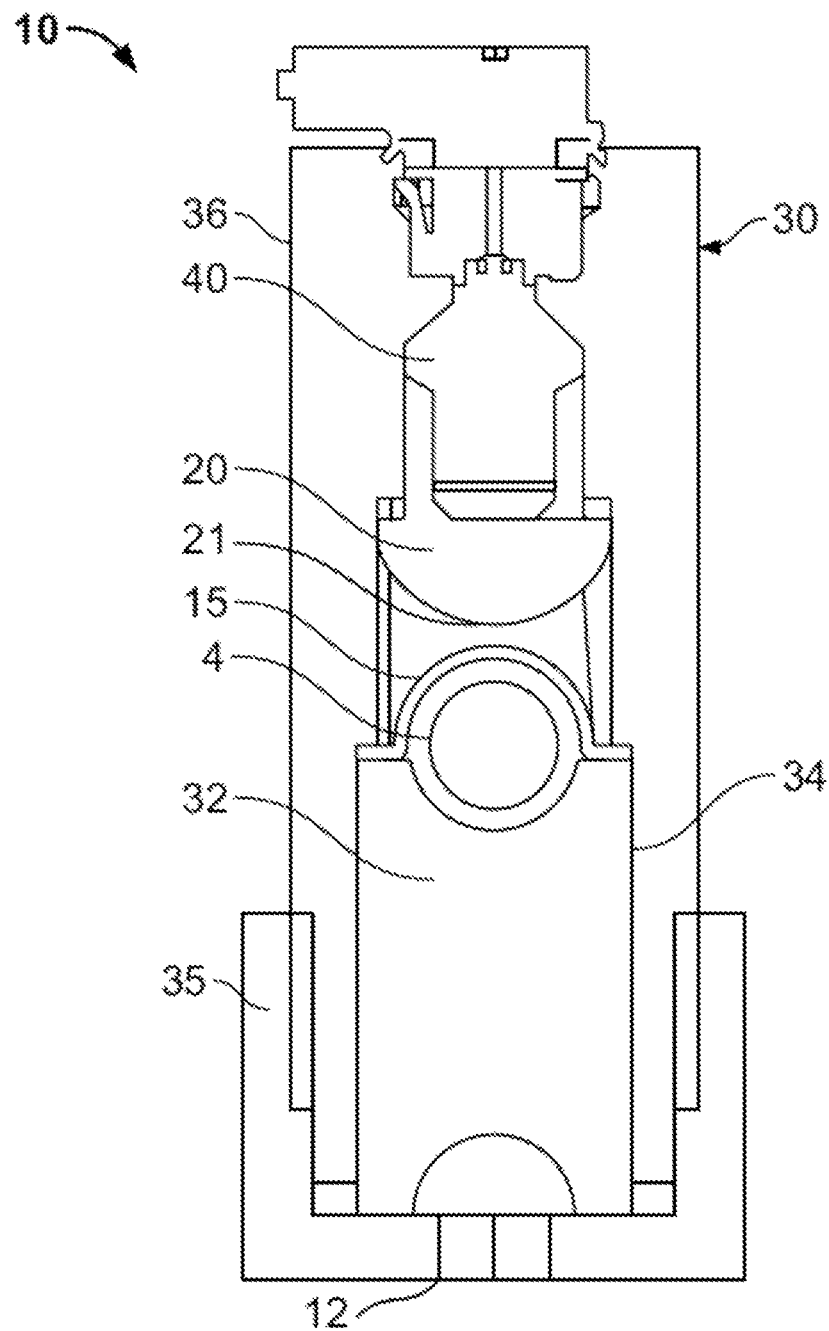
FIG. 5 is a first cross section of the blocking device taken along lines A-A of FIG. 1.
Figure 6:
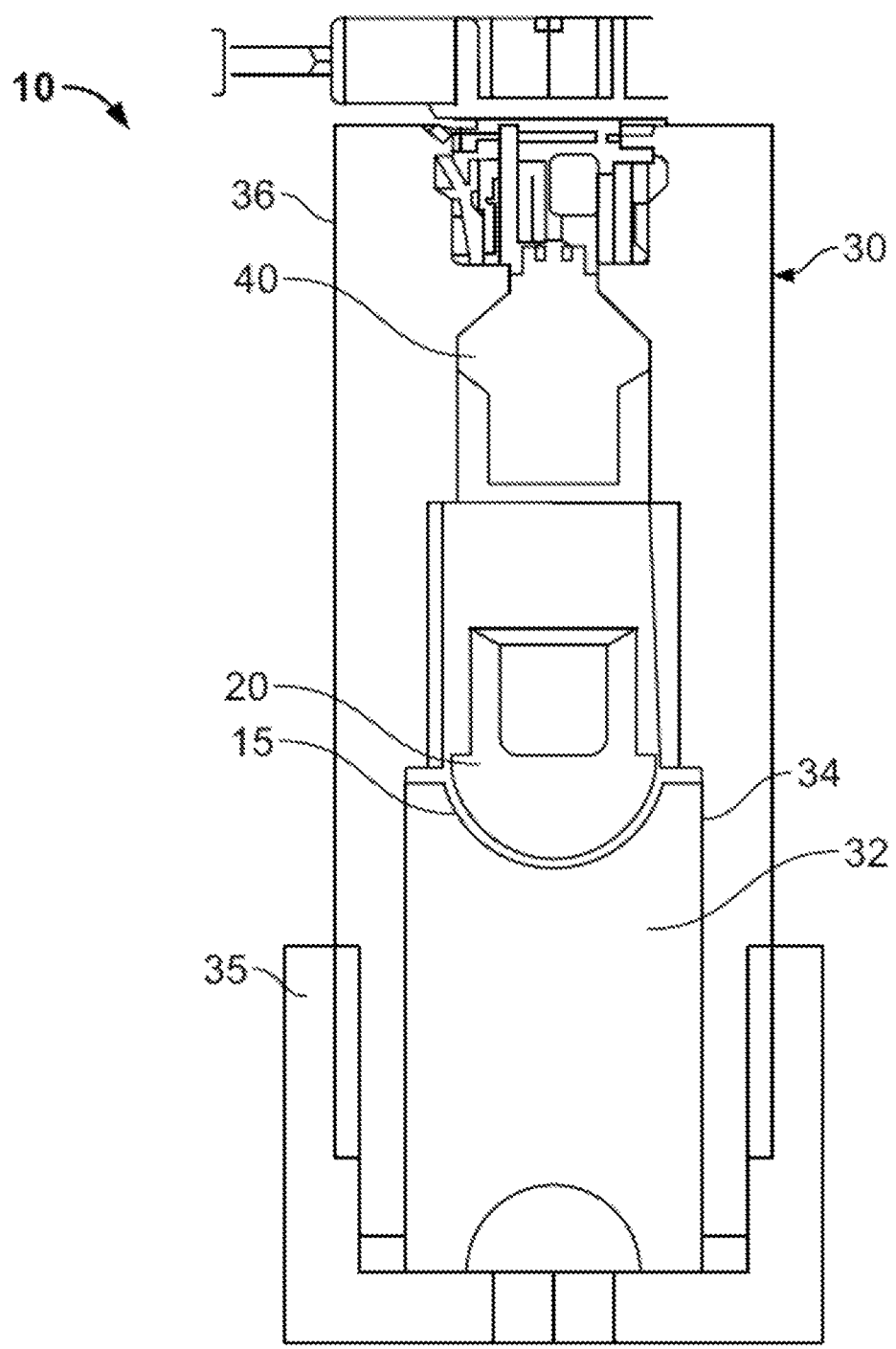
FIG. 6 is a second cross sectional view similar to the view of FIG. 5, but after activation of the igniter showing the piston blocking the line and moved to the bottom portion of the housing.

The igniter 40, as shown in FIGS. 4, 5 and 6, in its simplest form is preferably a pyrotechnic device. When a signal is received by this igniter 40, a fuel element burns and ignites an adjacent pyrotechnic charge which generates a shock wave that propels a piston to close the line 4 and not allow fluid to leak out and exit through any breaks in a line. Another more preferred way is to block the line 4 by propelling a piston 20 into a deformable element 15 positioned on or adjacent the line. The deformable element 15 deforms as it is forced against the line by the piston 20 causing the line 4 to change shape and close upon itself thereby entirely closing a section of the line leaving the line sealed and tightly closed. The device 10 in this particular state simply clamps over a line 4 so it can be taken off for service and replaced without actually interfering with the fluid line system in any way.

One of the key features of this is that it is not invasive, not intrusive to the fuel system. It is serviceable; it can be unclamped from the fuel line, replaced if for any reason there was warranty work. To insure the igniter 40 is functional, a monitoring pulse can be sent to the igniter 40 and check the integrity of the electrical circuit on a constant basis and activate a warning light in the car should the device 10 become defective and non-functional. This approach is similar to a feature on airbags to monitor the electrical circuit. If the device 10 becomes defective, and as mentioned it could simply be disconnected and replaced without interfering with the fuel line system.

In the above embodiment, the line 4 can be made of many materials including, but not limited to plastic or rubber and the deformable element 15 can be made of a deformable metal. To avoid any dissimilar material reactivity or corrosion issues, the device 10 can be made from aluminum with the exception of the housing of the igniter 40 which is plastic and the electrical interface is plastic. Ideally the device uses as much plastic as possible to reduce cost, reduce weight. Since the plastic won't react to the aluminum, the entire housing may be plastic.

The device 10 has the three housing pieces assembled together: an upper housing portion 36, an internal support 32 and the bottom cap portion 35. They are snapped or screwed together to apply a sufficiently high clamping force to the line 4 to reduce vibration and to keep the part from rotating on the line. It is important the device 10 not rotate or vibrate relative to the line 4. Preferably, the device 10 would be oriented with the upper portion with the igniter facing upward. This orientation would minimize any water or sediment from getting into the igniter area and obstructing the function of the igniter 40. By having the electrical connection in the upward position and orienting it in the vehicle it would allow water to drip away from the igniter 40 and never solidify in the event of freezing temperatures, etc.

The blocking element 20 can be any metal, preferably stainless steel or aluminum to prevent a reaction with the housing 30 which can also be aluminum or even plastic. The device 10 must go through 700 hours of salt mist exposure as part of a qualification so it is important there is no reactive features.

The internal support portion 32 can be a cylindrical post in the bottom cap portion 35. In this particular device, when one screws the bottom cap portion 35 in, the top of the cylindrical post 32 has a concavity that pushes up directly against the line 4. The upper portion 36 has an inner diameter large enough to accept the blocking piston or element 20. In FIG. 5, the piston 20 is shown actually sitting inside the chamber 34 in the upper portion 36. The chamber 34 is intended to direct the piston into the deformable element 15, collapsing it toward the concavity at the upper edge of the cylindrical post 32 in this way the deformable element 15 would collapse and close the line 4. The piston 20 is moved when the igniter 40 is fired. The piston 20 impacts and pushes the deformable element 15 against a top portion of line 4 to seal the line 4 to hold it closed with the deformable element 15 locked on top of the sealed line 4. The device 10 is configured to have the end of the element 15 held so the element 15, once collapsed, cannot spring open locking in the closed line position.

The view of FIG. 5 shows the very top portion 32. Contained in the top portion 32 is the igniter 40, it is shown with a body, the wider diameter can be a molded plastic that has an 11 mm diameter. At the top portion 36 of the housing 30 is shown a molded connector pocket interface. In airbags this is machined in, but there is a cost advantage to mold the connector. The connector is shown as an insert into the upper housing portion 36 with the electrical interface being a molded aspect. The igniter 40 would then mount from below the top housing portion 36 being inserted from the bottom, above the piston 20 and the deformable element 15 and the internal housing support 32 and bottom end cap portion 35. The upper housing portion 36 can be made of aluminum. The piston 20 has a lower spherical shaped end chamber end 21 that, as shown, encircles the igniter 40 and can be used to hold the igniter 40. Preferably, the igniter 40 is molded into the upper housing 36 or mechanically snaps it into the upper housing 36. The piston chamber end 21 is cup shaped and encircles the charge cup of the igniter 40 so the igniter 40 will fit down inside of the piston chamber end 21 of the piston 20. By having the piston chamber end 21 encircle the charge cup allows the piston 20 to get the proper proximity to maximize propulsion so that when the igniter energy is released, it is most effective to propel the piston 20. If the piston chamber is spaced too far away from the charge cup, a lot of igniter energy is lost and that wasted amount of energy is lost prior to getting the piston 20 to move. The deformable element 15 is preferably positioned directly above the line 4.

One novel aspect for this device 10 is that it is a device that could clamp onto any line in any system at any time and be able to be taken on and off without interfering with the lines.

Figure 3:
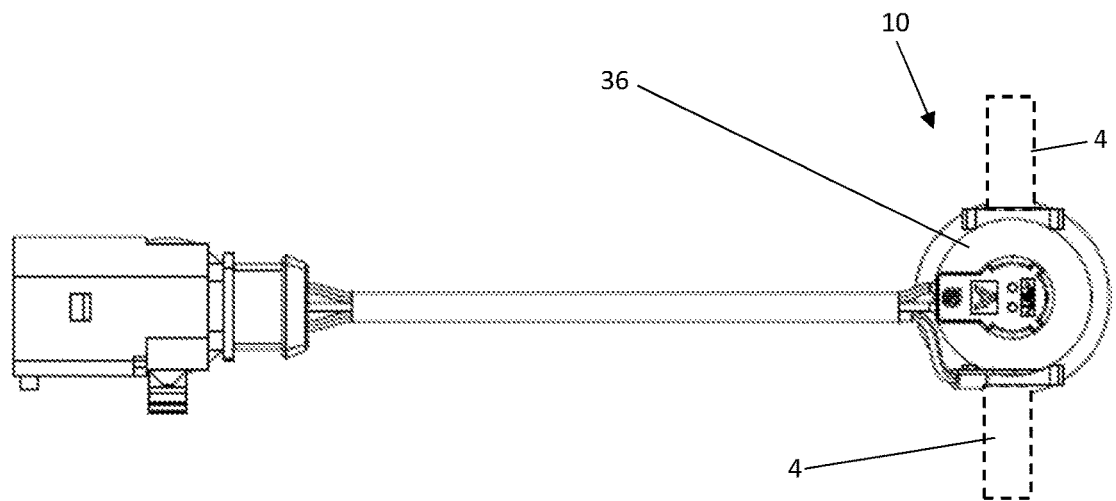
FIG. 3 is a top view showing the blocking device.

As shown in FIGS. 3 and 4, another option or alternative embodiment would be to provide the device 10 with a piece of fuel line 4 completely as an assembly, fully clamped around a line 4 with high pressure fittings at each end of the line allowing that section of fuel line to be put into any fuel line system. The former is the most attractive where it can bolt onto any system. A piece of fuel line could be provided with the device 10, for example rubber tubing with or without fitting ends as a further optional alternative.

The internal portion 32 is the mating portion that provides a support surface to make it more effective in collapsing the line 4 if one uses the piston or simply by supporting the line 4 if the shockwave is used to directly deform the deformable element 15 to close and block the line 4. If the line 4 moves during the event, the line 4 absorbs energy and the device 10 is less effective. In this particular cross-sectional view of FIG. 6, the line 4 is tightly nested when the device is clamped to optimize and allow the smallest amount of igniter energy to actually complete the event.

In FIG. 6, the activated blocking device 10 shows the piston propelled off the igniter 40 and crushing the deformable element 15 thereby collapsing the walls, tube or line 4 to seal the line 4. The deformable element 15 is a semi-circular shape in its cross-section with lateral edges held by the top portion and the internal support shoulder. The cross-sectional shape of the element 15 will be deformed when the lower portion of the piston 20 impacts the deformable element 15 causing the semi-circle effectively to be inverted and since the lateral ends are clamped, this creates a spring like force keeping the deformable element 15 in the line blocking position.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A blocking device comprising:
a housing disposed about a fluid line;
a piston housed in the housing;
an igniter that propels the piston to block the fluid line when activated; and
a deformable element initially positioned adjacent the fluid line and movable into closing engagement with a wall of the fluid line to create a closing in the fluid line through which a fluid cannot escape,
wherein the igniter when activated propels the piston against the deformable element into the fluid line collapsing the wall.

2. The blocking device of claim 1 wherein the igniter generates a shock wave to move the piston to block the fluid line.

3. The blocking device of claim 2 wherein the piston crushes or squeezes a portion of the fluid line to close the fluid line.

4. The blocking device of claim 1 wherein the housing has a first or top body portion having a slotted opening or passageway to receive the fluid line.

5. The blocking device of claim 4 wherein the housing has a bottom base portion having one or more venting passages to expel igniter gas from the housing.

6. The blocking device of claim 4 wherein the housing has the igniter attached to or stored in the first or top body portion.

7. The blocking device of claim 6 wherein the housing has a second internal body portion with a concavity for receiving the fluid line.

8. The blocking device of claim 7 wherein the first or top body portion, bottom base portion and second internal body portion are separate pieces removably attached to the other allowing attachment of the first or top body portion slotted opening over the fluid line prior to attaching the second internal body portion to the first or top body portion to position the housing on the line.

9. The blocking device of claim 1 wherein the igniter is a pyrotechnic device electrically connected to a crash detection system which activates the igniter on a signal.

10. The blocking device of claim 9 wherein the crash detection system is part of an airbag deployment system and the same signal initiating the airbag deployment activates the igniter.

11. The blocking device of claim 1 wherein the piston is positioned on or adjacent to the igniter and spaced from the fluid line.

12. The blocking device of claim 11 wherein the deformable element has a first concave surface positioned near or on the fluid line.

13. The blocking device according to claim 12 wherein the deformable element is configured to collapse an adjacent position of the fluid line and then hold tightly blocking the fluid.

14. The blocking device according to claim 1 wherein the deformable element is shaped as a semi-circle or a semi-oval.

15. A system comprising the blocking device of claim 1 in combination with a length of tube or line already fitted to the blocking device.

16. The system according to claim 15 wherein the housing of the blocking device is a one-piece housing with the tube inserted through a passage in the housing.

17. A blocking device comprising:
a housing disposed about a fluid line;
a piston housed in the housing; and
an igniter when activated propels the piston to block the fluid line,
wherein the housing has a first or top body portion having a slotted opening or passageway to receive the fluid line, and
wherein the housing has a bottom base portion having one or more venting passages to expel igniter gas from the housing.

18. The blocking device according to claim 17, wherein the housing has the igniter attached to or stored in the first or top body portion, and wherein the housing has a second internal body portion with a concavity for receiving the fluid line.

19. The blocking device according to claim 18, wherein the first or top body portion, bottom base portion and second internal body portion are separate pieces removably attached to the other allowing attachment of the first or top body portion slotted opening over the fluid line prior to attaching the second internal body portion to the first or top body portion to position the housing on the line.

20. A blocking device comprising:
a housing disposed about a fluid line;
a piston housed in the housing; and
an igniter when activated propels the piston to block the fluid line,
wherein the igniter is a pyrotechnic device electrically connected to a crash detection system which activates the igniter on a signal, and
wherein the crash detection system is part of an airbag deployment system and the same signal initiating the airbag deployment activates the igniter.

* * * * *